United States Patent
Pacheco et al.

(10) Patent No.: US 10,043,423 B2
(45) Date of Patent: Aug. 7, 2018

(54) PRINTED MEDIA DISPLAY WITH DOUBLE SHEET OR TILTING WINDOWS TO INSERT OR REPLACE EXPOSED MEDIA

(71) Applicants: Antonio Ricardo Pacheco, Londrina (BR); Roberto Mahamud Filho, Southlake, TX (US)

(72) Inventors: Antonio Ricardo Pacheco, Londrina (BR); Roberto Mahamud Filho, Southlake, TX (US)

( * ) Notice: Subject to any disclaimer, the term of this patent is extended or adjusted under 35 U.S.C. 154(b) by 57 days.

(21) Appl. No.: 15/360,047

(22) Filed: Nov. 23, 2016

(65) Prior Publication Data
US 2018/0096638 A1 Apr. 5, 2018

(51) Int. Cl.
| | |
|---|---|
| *G09F 23/00* | (2006.01) |
| *G09F 21/04* | (2006.01) |
| *G09F 7/10* | (2006.01) |
| *B60N 3/02* | (2006.01) |

(52) U.S. Cl.
CPC ............... *G09F 23/00* (2013.01); *B60N 3/02* (2013.01); *G09F 7/10* (2013.01); *G09F 21/04* (2013.01)

(58) Field of Classification Search
CPC . G09F 23/00; G09F 7/10; G09F 21/04; B60N 3/02
See application file for complete search history.

(56) References Cited

U.S. PATENT DOCUMENTS

| | | | |
|---|---|---|---|
| 1,010,133 A | 11/1911 | Fleming | |
| 1,812,972 A * | 7/1931 | Miller | B61D 49/00 40/318 |
| 2,277,088 A | 3/1942 | Ehrenhaft | |
| 2007/0079478 A1* | 4/2007 | Gordienko | B60N 3/02 16/428 |
| 2009/0134613 A1 | 5/2009 | Eber et al. | |
| 2010/0095567 A1* | 4/2010 | Li | G09F 3/20 40/318 |
| 2010/0115809 A1* | 5/2010 | Pacheco | B60N 3/023 40/318 |
| 2010/0115890 A1 | 5/2010 | Granili | |

FOREIGN PATENT DOCUMENTS

| | | |
|---|---|---|
| BR | MU8800661-1 U2 | 9/2008 |
| BR | MU8802555-1 U2 | 11/2008 |
| BR | MU8901506-1 | 6/2009 |
| BR | MU910692-4 | 8/2011 |

(Continued)

*Primary Examiner* — Gary C Hoge
(74) *Attorney, Agent, or Firm* — Scott Houtteman; Kile Park Reed & Houtteman PLLC

(57) ABSTRACT

PRINTED MEDIA DISPLAY WITH A TWO-SHEET OR TILTING WINDOW FOR INSERTING OR REPLACING EXPOSED MEDIA is a constructive solution in which the anterior wall (15) of the media display support structure (1) has a recess (2) that receives a window, either tilted or removable (3) by the action of hinges (4), or bolts (5) and nuts (6). It can also lateral mobility through guides (7 or 13), through which it moves behind the fixed window (18), corresponding to more than half of the anterior wall (15), or behind itself from the curve (16), from which a reception compartment is projected (14), dug in the portion corresponding approximately to half of the extension of the posterior wall (8).

6 Claims, 11 Drawing Sheets

(56) References Cited

FOREIGN PATENT DOCUMENTS

| | | |
|---|---|---|
| BR | MU9101692-4 | 8/2011 |
| CA | 2453679 A1 | 6/2003 |
| CN | 2594080 | 12/2003 |
| CN | 2911865 | 9/2007 |
| DE | 178423 C | 11/1906 |
| DE | 9104744 U1 | 8/1991 |
| DE | 20309342 U1 | 6/2003 |
| DE | 202005012035 U1 | 7/2005 |
| DE | 202006005138 U1 | 3/2006 |
| DE | 102007057590 A1 | 11/2007 |
| EP | 1671840 A1 | 6/2004 |
| JP | 06127380 | 5/1994 |
| WO | WO2008089603 | 7/2008 |

\* cited by examiner

PRINTED MEDIA DISPLAY WITH DOUBLE SHEET OR TILTING WINDOWS TO INSERT OR REPLACE EXPOSED MEDIA

INTRODUCTION

The present report describes constructive improvements proposed to make the insertion and replacement of printed media in a specifically designed compartment possible through a transparent window, movable either by tilting or lateral displacement, that can be removed and replaced by using a bolt with a hinge, other bolts or guides.

The printed media display consists of a support structure in which a passenger's grab strap/hand grip inside mass transportation vehicles is integrated, molded in rigid, transparent photopolymer or similar material so that printed media, preferably in paper, can be seen on the two sides of the display. This support structure is installed in the handrail provided by these vehicles, with a recess, so that the user, instead of using the handrail for support, uses the anatomic sector with the referred support structure.

The first constructive solution presents a support structure that includes a transparent window, also molded in rigid, transparent polymer or similar material, fixed by a hinge at the top and a bolt at the bottom.

As a second possibility, the same transparent window has a bolt at the top instead of a hinge, and a bolt at the bottom to fix it to the support structure.

As a third variable, the window, molded in transparent photopolymer or similar material, with dimensions corresponding to a little more than half of the anterior portion of the display, runs/slides through the guides, at the top and at the bottom.

In the fourth version, the window, with dimensions greater than the anterior portion of the display, runs/slides through a curved guide that extends halfway the posterior portion of the display, where a compartment, molded with transparent and flexible photopolymer, is developed to accommodate the mobile window.

In the two first versions, there are at least two fastening points: a top hinge and a bottom bolt or top and bottom bolts, also molded with rigid or similar transparent photopolymer.

In the case of the other constructive solutions, the transparent window slides through the guide-like recess provided at the top and at the bottom. In the version where the window is flexible, this guide has a curve on the right lateral portion of the display, projecting itself from behind, halfway to the posterior wall towards a compartment that receives the window, when in an open position.

STATE OF THE ART

This is how improvements are introduced in the technique instructed in patent BRMU9101692-4, deposited on Aug. 17, 2011, entitled IMPROVEMENTS INTRODUCED IN THE CONSTRUCTIVE CONCEPT OF A MESSAGE CARRIER DEVICE, INCLUDING A PASSING COMPARTMENT FOR REPLACING ONE MEDIA BY INSERTING ANOTHER, OR BY CLIPPING, owned by this applicant. They expand and improve its functional concept, simplify its manufacturing process and facilitate the process of replacing and updating displayed messages.

In this sense, devices related to displaying advertising messages in the mass transportation system are highly widespread, contemplating the most diverse constructive solutions, from simple exposure by external or adhesive printing to sophisticated folding or removable structures.

In searches carried out on the technique state of the art, it was possible to find documents including several operative concepts, out of which, after discarding those whose operations follow different rather than similar concepts of those presented in this report, we selected the following:

DE178423C, deposited on Nov. 17, 1906, in which the inscription support is presented (b) in the form of a fork and with two lateral panels (b', b") on both sides of the notice board.

U.S. Pat. No. 1,010,133A, deposited on Dec. 19, 1910, entitled STREET CAR STRAP, presents an equipment to be used in mass transportation vehicles to distribute antiseptic fluid, disinfectant and germicide on manual contact portions.

U.S. Pat. No. 1,812,972, deposited on May 29, 1930, entitled HANDLE FOR STREET CAR STRAPS, instructs on the exposition of advertising material (19), printed media in the form of a card or something similar, present in the frame configured by flaps (14 and 15) provided on the wall (16) on which the strap/handle itself is also molded (3).

U.S. Pat. No. 2,277,088A, deposited on Aug. 7, 1939, entitled ADVERTISING STRAP HANGER, which is a stationary hanger and belt-like framework that includes a luminous advertising sign, as well as electrical lights, an electrical circuit, including energy source and a stationary contact switch.

DE9104744U1, deposited on Aug. 14, 1991, instructs on a handle body (11) associated to a reception mean (12), for at least one information support (17), in which the reception means (12) are integrally connected to the body of the handle (11). In addition, the information support (17) in the reception means (12), disposed on both visible sides, is characterized by the fact that, from the exterior and through one side of the structure (13), it is pushed inside the cut-off line (26). A frame (13) is provided on at least two sides facing each other, on the three internal sides of the structure (13). The frame (13) has one side pushed inwards through the guide (16), corresponding to the dimensions of the information support transversal section (17), which corresponds to the guides' depth (18,19,23,24). The information support (17) includes one support plate (28) associated with at least one information mean (27), the size of the support plate (28), and conceived, particularly, as a decal or an adhesive film The same document (DE9104744U1) also claims that the information support (17) includes a label with a support information plate (28), in which the support plate (28) is proposed with one information on both sides; in which at least one frame (13), but preferably both, is the support surface (25,29). This support surface is integrally connected to the structure (13), in which the information means (27) are approximately as large as the reception faces (25,29) and glued on the support plate (28) or on the reception faces (25,29).

JP06127380A, deposited on May 10, 1994, contemplates the fitting of two transparent pieces on the extension of the support loop or handle support belt for passengers in mass transportation vehicles, in such a way that an advertising card can be inserted. Such fitting pieces constitute a body (b) formed by exhibit sectors 6,7 made of transparent resin, front walls 8 that form two portions of the lateral wall 9. Collars 10, 13 are provided on the superior and inferior parts and, laterally, openings 12 on wall 9. Between such pieces and the belt, cards (c) are inserted with printed messages to be disclosed. Other constructive factors are related to the frontal wall 8', to the lowered portion 13' of the lateral wall, and to points 9' and 10', among others.

DE20309342U1, deposited on Jun. 17, 2003, entitled ADVERTISING DEVICE (WERBEMÖGLICHKEIT IN HALTESCHLAUFE), describes a safety belt for local traffic vehicles, including two transparent plastic elements (2, 4) welded together, including one print advertising carrier (3).

CA2453679A1, deposited on Jun. 18, 2003, entitled: PUBLICITY DISPLAY FOR BUSES AND MASS TRANSPORTATION VEHICLES (AFFICHAGE PUBLICITAIRE POUR AUTOBUS ET AUTRES VEHICULES DE TRANSPORT EN COMMUN), informs on a dial installed on one side of the safety belt fastening element to the superior handrail, including a lateral panel fixed with bolts and nuts.

CN2594080, de Dec. 24, 2003, entitled RING ADVERTISING HANDLE ON CARRIAGE, describes a handle with an inferior section (3) with bumps (11), and with a transparent central portion (5) to receive an advertising card through the opening (7).

EP1671840A1, deposited on Jun. 15, 2004, entitled HAND GRIP, mentions a suspended strap for passengers support in mass transportation vehicles, including a plate with a slot that allows the fast introduction or replacement of the information card.

DE202005012035U1, deposited on Jul. 28, 2005, entitled HAND GRIP SPECIALLY DESIGNED TO OPERATE FIXEDLY IN TRANSPORTATION VEHICLES (HALTEGRIFF, INSBESONDERE FÜR FESTHALTESCHLAUFEN IN FAHRZEUGEN), instructs on a belt (12) and a slot with two halves (14a, 14b) coupled through a slot arrangement and a pin.

DE202006005138U1, deposited on Mar. 29, 2006, entitled FIXED HANDLE (HALTESCHLAUFE), highlights a device in which the media placed between the two faces forming the set is inserted or removed through disassembly.

US2009/0134613A1, deposited on Dec. 19, 2006, entitled HANGING STRAP, mentions an insertion mechanism through which the media is pushed by a carrier/transporter into a gap (10) on the protection covers (8a,8b). It is a support belt fixed by a bow (1), for one person, with a compartment formed by at least two individual faces (3a, 3b), limited in the superior (4a, 4b) and inferior (5a, 5b) sectors.

CN2911865, de Sep. 13, 2007, entitled ADVERTISEMENT HANDLE FOR PUBLIC TRAFFIC TOOLS, presents a handle for mass transportation vehicles with a place for advertising. FIG. 1, together with the descriptive report, shows that the utility model is composed of a panel (6), whose upper part is connected by a handle (4) and a loop (3) and the inferior part has an opening for an anatomic grip (7). The panel (6) also has a space between its anterior and posterior parts for advertising cards insertions. The utility model is characterized by the fact that one clamp is connected by two pieces.

DE102007057590A1, deposited on Nov. 28, 2007, entitled TICKET HOLDER WITH INFORMATION (HALTEVORRICHTUNG MIT INFORMATIONSTRÄGER), introduces a device (1) with a fastening mean (3) in relation to the handrail (4), a spacer (5) and holder (6), considering that the retention device (1) is the information holder (7), in at least one portion of the spacer (5). As inferred by the descriptive report, the so-called spacer (5) is proposed under several constructive forms, including pyramidal. The connecting and fastening means are obtained through gluing, the use of screws or other conventional connecting means, and can be disposable or permanent or yet consolidated by a special tool or key that prevents unauthorized or accidental liberation. As for the so-called spacer (5), there is a posterior projection (29) on the projection opposite side (28) to be introduced to the fastening mean (3) and bolted, glued or fixed in some other way. The information support (7), on the other hand, may have a recess inside of which a poster or a leaflet is placed or may contain impressions on the surface, painted or as an adhesive. In addition, the information support (7) contains light sources such as LEDs, etc. that light up the information, or an electronic screen or monitor and a tracking system that can work in a synchronized way to provide messages of establishments close to the place where the transportation vehicle is located. As for the non-electronic constructive solution, the support (17) has a cavity (38) in which the information piece is introduced.

WO2008/089603, deposited on Jul. 31, 2018, entitled A ROTATABLE ADVERTISEMENT HANDGRIP, instructs on a HANDLE with rotating ads, consisting of two strap faces (1) with transparent chambers (2) with the set connected to the mass transportation vehicle bar or handrail, in an articulate way. The objective is to provide the user with the message display and the support.

BRMU8800661-1 U2, deposited on Sep. 5, 2008, entitled CONSTRUCTIVE PROVISION APPLIED TO THE SUPERIOR SAFETY HANDRAIL WITH AN ADVERTISING SLOT FOR MASS TRANSPORTATION, owned by this applicant through granting and transfer document, instructs on a main body formed by a support with rounded vertices, whose inferior section has a handgrip, centrally, with bumps and undercuts, forming an anatomic section. Above the cavity, there is a visor for advertisement insertion through the lateral cavity, and the superior section handle has a plug/spigot that receives one cover fastened to a handle coupled to a pin placed in the interior of the support loop with a passing hole for coupling in the grab bars.

BRMU8802555-1 U2, deposited on Nov. 13, 2008, entitled INFORMATION HANDLE COUPLED TO A SAFETY HANDRAIL OF MASS TRANSPORTATION VEHICLES, also owned by this applicant, refers to a constructive solution that provides a message display panel (1)) molded in translucent material, bringing, inferiorly, a handle (4) to offer the user more comfort when riding standing up. This way, the user does not grab the safety handrail anymore for support, but lean, using one of the hands, on the anatomic sector (6) provided by the referred handle (4). Such panel (1) and handle (4) are fastened to the safety handrail by a device (3) with a passing hole (5) that receives the handrail, and the connection between the panel (1) and the device (3) is made through a flexible belt (7), conferring the necessary balance to the set.

US2010115809A1, deposited on Nov. 13, 2008, entitled ADVERTISEMENT HANDLE COUPLED WITH GRAB BAR OF PASSENGER TRANSPORTATION VEHICLES, introduces an information handle coupled to the safety handrail of mass transportation vehicles, including a message display panel molded in translucent material.

BRMU8901506-1 U2, deposited on Jun. 12, 2009, entitled PROVISION INTRODUCED IN A SUSPENDED STRAP FOR PASSENGERS SUPPORT IN MASS TRANSPORTATION VEHICLES, includes a main body (2) obtained by a transparent polycarbonate injection of rectangular format, with a superior rectangular projection in its superior portion (3). This thin structure, connected to a clamp-like coupling device (4), was developed (5) to be fastened to the horizontal cylindrical bars (5) in mass transportation vehicles. The main body (2) shows a thin rectangular geometry, with approximately two thirds of its superior portion showing a lowered area (6) of rectangular format and flat, and the remaining inferior portion showing a rectangular opening (7) whose inferior segment (8) has on its superior face sinusoidal bumps (9) compatible to fingers which conform an anatomic profile. The advertising piece (11) is inserted through an opening (12) provided on the lateral face.

US2010/0095567 A1, deposited on Apr. 22, 2010, entitled HANDLE WITH ADVERTISING AREAS, refers to an advertisement display device to be used on buses, subways and other mass transportation vehicles. The device can be installed and removed from a handrail easily and can help people hold on better and easily to the handrail. It proposes one fixed part and a connecting knitted loops. The device has five spaces to hold advertising sheets and leaflets distribution. Sheets and leaflets can be removed from the sector in which they are inserted.

BRMU9101692-4, deposited on Aug. 17, 2011, entitled IMPROVEMENTS INTRODUCED IN THE CONSTRUCTIVE CONCEPT OF A MESSAGE DISPLAY DEVICE, WITH A PASSING COMPARTMENT FOR SUBSTITUTING MEDIA BY THE INSERTION OF ANOTHER, OR CLIPPING, owned by this applicant, includes a constructive solution in which a print media exhibitor (1), molded in transparent material. It brings, inferiorly, a support strap (4) for mass transportation vehicles users in general and is proposed under two basic constructive solutions: one with two lateral features (8, 8b) between which a passing compartment (10) is formed; another with one lateral feature only (8), but with an access cutting (8c) to remove the print media to be replaced. In cases where lateral features are provided (8,8b), a passing compartment (10) is formed between them to accommodate printed media, whose replacement or updating function is given by the compartment dimensions (10) in relation to the media piece or by the ramp action (10a) projected in the exhibit chamber (10). This can also be done by the guiding devices of the embedded media in relation to the side tears (8,8b), whose constructive solution can configure a manual pressure button (9) or a visor (11) or a flexible window, both with a ramp (9$^a$, 10$^a$).

Technique state of the art documents show that, although some of them present operative concepts similar to those proposed in this report, this proposal does introduce, in an effective way, a new form or requirement involving an inventive act that results in improvements in the way printed media displays inserted in a transparent compartment are used and manufactured. Their substitution and updating are not made through superior and inferior lateral openings, prints in form of decal or adhesive films or through plates on the two faces of the display device anymore, but rather through a rigid or flexible window, bigger than half of the anterior portion of the display and bigger than the anterior portion of the display. They have ascending mobility, when fixed with a hinge and a tilting system, or lateral mobility, when installed in guides provided by the support structure.

Thus, the insertion of the new media is made through the provided window on the anterior face of the display, whose constructiveness and functional principle vary according to the presented versions, characteristics not found in none of the common techniques used/taught before.

For instance, document U.S. Pat. No. 1,812,972, although it anticipates the exposition of publicity material in printed media in form of a card, instructs that its fixation should be done through the provided flaps on the wall in which the support strap is molded while document U.S. Pat. No. 2,277,088A deals with a luminous plate Document DE9104744U, on the other hand, deals with a handle associated with a reception mean for at least one information support, placed on both visible sides of the display. The information support is pushed into the cutting, or has a label with one plate for information, something similar to the object of documents US2009/0134613A1 e US2010/0095567 A1, in which the media are also pushed, but by a transporter into a gap provided on the protection covers.

In turn, document JP06127380A proposes that information cards should be inserted between the fitting parts of the display, while documents DE20309342U1 and CA2453679A1 refer to transparent elements welded together, and a panel fixed merely with bolts and nuts, respectively.

Document DE202005012035U1 proposes a configuration in which the coupling mean between the two parts of the dial constitutes the object being effectively claimed, in this case by fitting and pin.

Document CN2594080 instructs on a strap composed of an inferior section with saliences/bumps, being its transparent central portion designed to receive the advertisement card, whose insertion is made through a lateral opening, similar to that described in document EP1671840A1.

Document DE202006005138U1 also proposes that printed media be inserted in the display but by disassembling the device. As inferred by the corresponding report, it is evident that the media insertion cannot be done without disassembling the faces (3a, 3b) and the use of a transporting device. If the belt overpass the display, the insertion of two media pieces on each side is necessary unless the message is visualized from only one side of the display only.

Also in document DE102007057590A1, the insertion and/or replacement of media is made by disassembling the device.

Document CN2911865 refers to a strap/handle used for mass transportation with a place for advertising, including a gap between its posterior and anterior parts for the insertion of an advertising card. This operation, although not described in the document, is presumed as being done through lateral tears provided in the display.

Document WO2008/089603 mentions faces joining and forming a strap/handle, but does not specifies the process of media insertion or replacement, as in the case of document US2010115809A1.

Document BRMU8901506-1 U2 which, although anticipated by document owned by this applicant, informs on the presence of a single opening provided on the lateral face (12) through which, obviously, the publicity piece is inserted and removed. [047] This is also the case of document BRMU8800661-1 U2, in which a single access to the display, called visor, is provided (9), i.e., a cavity (10) on the lateral side, which means that the media substitution or updating functions presupposes either the disassemble of the display or the use of a special tool.

In regards to patent MU9101692-4U2, as in documents MU8800661-1U2 and MU8802555-1 U2, also owned by this applicant, a solution is presented that improves the common use general concept present in the construction of practically all displays with the same objective, namely: suspended support straps/handles for passengers in mass transportation vehicles whose structural disposition allows the introduction of information cards.

This is how the object of the present report improves the technique state of the art, since, as it can be understood from the reported documents, existing devices do not need electro-electronic components to work, as in the case of those in documents U.S. Pat. No. 2,277,088A e DE102007057590A1. It contemplates complex mechanisms for its construction or are inefficient in regards to insertion operations and print media replacement, which are realized through the conventional technique or through an opening in the display, which, sometimes, is done with special tools or disassembly.

By way of exemplification, it is the concept proposed in document DE102007057590A1, in which the media insertion is done from top to bottom, in a vertical cavity, as in the case of the external frame provided in document U.S. Pat. No. 1,812,972, in which the media is inserted limited by lateral flaps.

On the other hand, the media replacement and updating operations, presented in documents JP06127380A, DE202005012035U1 and DE20309342U1 are too complex, in which the two faces are fitted on a pre-existing belt, and the printed media is placed between the two belt layers, respectively. This is also the case of document CA2453679A1, in which the replacement or updating function presupposes the replacement of the display itself.

Even though they present a similar general concept, the related documents are improved in the object being compared. It is the case of document U.S. Pat. No. 1,812,972, where the present object eliminates the use of an external frame for the printed media, which is inserted in a transparent to be visualized on both sides, which does not occur in the mentioned document, in which access to the message is given only by one side of the display.

In relation to Document JP06127380A, which presents a publicity panel (b) formed by two parts (6,7) of transparent resin, ready to receive the publicity notice (c) together with (b, c), and positioned over the connecting band between the strap/handle (1) and support bar of a mass transportation vehicle, since it eliminates the need to disconnect the fitted pieces.

Document CA2453679A mentions a traditional support device (2), with a hanging handle with a fastening loop (6) to be installed on the grab bar of a mass transportation vehicle. It also includes a tusk ring (4) for users of such vehicle, an intermediate part (8), with a hole (9) and a rectangular plastic board (10) fastened to the handle (2) by a connecting system (14) on which the advertisement piece is fixed or printed (12). These proposed improvements replace the rectangular board fastened mechanically, visualized on one side, by a transparent display visually accessible on the two sides. This concept, thanks to an access through an anterior window, allows the insertion and/or replacement of a piece of media, whereas, in the case of the reference document, message replacement means replacing the whole board or panel.

In relation to document US2009/0134613A1, it proposes an object identical to that mentioned in document DE202006005138U1, but with an insertion mechanism in which the media is pushed into a gap by a transporter (910) in the protection covers (8a, 8b). The improvements claimed here simplify the media insertion and/or replacement operation, which does not happen in the reference document, which provides an entry sector and presupposes the use of a transporting device, considering that the disassembling of the device pieces is indispensable for replacing the media, as reported in document DE202006005138U1.

In relation to document DE102007057590A1, the concept is improved as the cavity (38) in which the information piece is introduced from top to bottom and is replaced by the anterior window, considering that the media replacement, in the case of the document found, is mechanically possible only with the disassembling of the support (7).

In regards to Documents DE202006005138U1 and US2009/0134613A1, specifically, they claim for an identical matter, except for the fact that the latter provides an insertion mechanism through which the media is pushed by a transporting device into a gap. However, they both deal with a hanging strap/holding loop (1) with a fastening strap/fastening loop to be applied to a holding rod/grab bar of a grab strap/gripping loop (2) and with an advertising panel that includes two elements made of transparent plastic (3a, 3b), connected by clamp-fitting elements (7). Such gripping loops (1, 2) constituted by a flat strip form a typical handle used in mass transportation vehicles while the advertising panel (3a, 3b) by being fixed to the loops (1 and 2) with a bolt or nail (6) constitutes element of connection between the two loops (1 and 2 in both documents), conforming a typical hanging strap. In the case of the Applicant display, since patents BRMU8800661-1, BRMU8802555-1, BRMU9100051-3 and BRMU9101692-4, in effect between Sep. 5, 2008 and Aug. 17, 2011, the handle neither trespasses the advertising panel nor constitutes the strap hanger of previous documents as well as does not show an anterior window that conforms the compartment for printed media storage with the posterior wall.

The other patents have no relation with the present object, except for the fact that they constitute information means that take advantage of bars available in mass transportation vehicles.

Therefore, based on the assumption that handles provided in mass transportation vehicles are dirty and hardly ever replaced, and, associated with the lack of ventilation, may constitute a threat to people's health, document U.S. Pat. No. 1,010,133A proposes two alternatives (FIGS. 1-7). A hanging strap (1) equipped with a disinfecting device, to be applied to a grab bar (6) of a mass transportation vehicle, to guarantee adequate hygiene conditions. Such disinfecting device is formed by two parts (9) (page 1, lines 100-103). The part visible to the passengers has a latch capable of holding an advertising notice that, alternatively, may be printed or glued on the surface of such part of the piece (9) (pg. 2, lines 19-25). The document also shows (FIGS. 8-10) a disinfecting device (23) to be applied directly to the grab bar (2) of a mass transportation vehicle (page 2, lines 40-44), with latches (33) to hold an advertisement notice (page 2, lines 64-66).

It is evident that the object of the present patent is sufficiently different from the invention described in document U.S. Pat. No. 1,010,133A, since a transparent display incorporated is provided in the users' support handle in mass transportation vehicles.

As mentioned before, document U.S. Pat. No. 2,277,088A describes a support device with a metallic structure (10) and a handle (11), with two transparent boards (12, 13) able to support advertising notices and carry inside a variety of lights to light up the boards (12, 13), when the handle is pressed. This device is different from the object proposed here, in which a display is incorporated in the support handle which has in its anterior window operability its main feature/characteristic.

Document DE20309342U1, which was also referred to before, contemplates the propagation of advertising notices between the elements that conform the safety belt itself which are, actually, a typical mass transportation handle made of two elements made of transparent plastic welded together, between which the advertising notice is placed. It is important to emphasize that such document, like several others mentioned here, does not offer a provision for media replacement and/or updating. However, the object of the present patent informs on the presence of an anatomic sector, with an ergometric conformation plus an anterior window through which the media stored in the compartment can be removed, replaced and/or updated, with no need to dismantle the display or use of special tools.

Document DE202005012035U1, with an extremely similar concept to that presented in document DE20309342U1, illustrates a fitting device (10) with a hanging strap, including a belt (12) and an element with two halves (14A, 14 B) connected by a hinge, and a deposit cavity for such hinges. This element (14A, 14 B) is capable of molding a belt (12) on which advertising notes are printed or recorded, making it very different from the object claimed here. The object claimed here provides a display that is incorporated to the handle/support strap and the message is replaced or updated by a simple insertion of the new media, with no need for recording or printing new notices in any part of the display.

Finally, document BRMU8802555-1 U2, in which a message display panel (1) molded with translucent material with handle (4) is provided, is owned by this Applicant and was improved according to the object of this request. Document BRMU8800661-1 U2, also owned by this Applicant, refers to a panel with one access cavity in only one of the lateral sides of the display, which means that the media compartment is not a passing one; thus determining that the printed media can only be replaced and/or updated through dismantling the display or by using a special tool.

Therefore, the changes proposed here bring significant operative improvements since the propagation of messages is done without the help of electrical and electronic means or any kind of luminous device, using only the transparence of the material that molds the display. It is projected in a way that the printed media is inserted in the compartment through the anterior window, which, in its constructive versions, can be tilted, slide laterally or be removed.

This anterior window, molded with transparent material, sometimes rigid and sometimes flexible, can tilt upwards from the hinge and be fixed back in its resting place by an also transparent bolt and nut produced in the support structure itself. The window can also be fixed by superior and inferior bolts, through nuts produced in the support structure itself or still run laterally through guides dug in the support structure. [067] In the case where the anterior window is of the sliding type, a variation is proposed in which it is molded in flexible material to be able to slide through the guide and bend itself behind itself, being received in the compartment located on the posterior wall.

All things considered, it becomes evident that the improvements proposed here presupposes the existence of important prior information such as those found in the state of the art. They report on changes that improve the functional aspect regarding use and manufacturing, typifying the patent perfectly in the utility modality, once the new form and provisions that involve the inventive act are characterized.

SUMMARY OF THE OBJECT OF THE PATENT

Considering the state of the art observations made before, the object of the present descriptive report is a constructive solution that, when applied to a media display device, improves the system of material insertion or replacement by using an anterior transparent window with sufficient mobility to give access to the insertion compartment. And, according to applicable variable, it can be done by caved recesses in form of guides in the support structure for the displacement of the mobile window and by a fixed window with the size corresponding to practically half of the anterior wall, by at least one thread with a nut and a hinge applied to the mobile window.

The referred transparent window is proposed in at least four constructive variables and molded sometimes with rigid material and sometimes with flexible material, according to the use or not of a curved guide.

Therefore, we have a support structure (1) fitted by an anterior recess (2) to receive a mobile window (3) with either a superior hinge (4) and an inferior bolt (5), superior (6) and inferior (5) bolts or guides (7) that run the forward and rearward extensions of the support structure and through which the mobile window (3) moves laterally. They can also run through a guide (13) that runs the anterior extension until the right lateral sector, bending behind itself until the middle of the posterior wall (8) in which, according to this version, a compartment (14) is designed to accommodate the mobile window (3).

DESCRIPTION OF FIGURES

The characterization of the improvements presented here is given through representative drawings of the proposed constructive solution in such a way that both the main support structure as well as the access window, offered in at least four constructive variations, may be understood with the necessary clarity.

The figures express the preferred ways to realize the idealized product and provide foundations to the present description through numerical and consecutive remissions to clarify the constructive and operative otherwise implied in the adopted representation, determining the postulated tutelage precisely. Such figures are merely illustrative and may show variations, provided they do not dodge from the initial claim.

Figure 1:
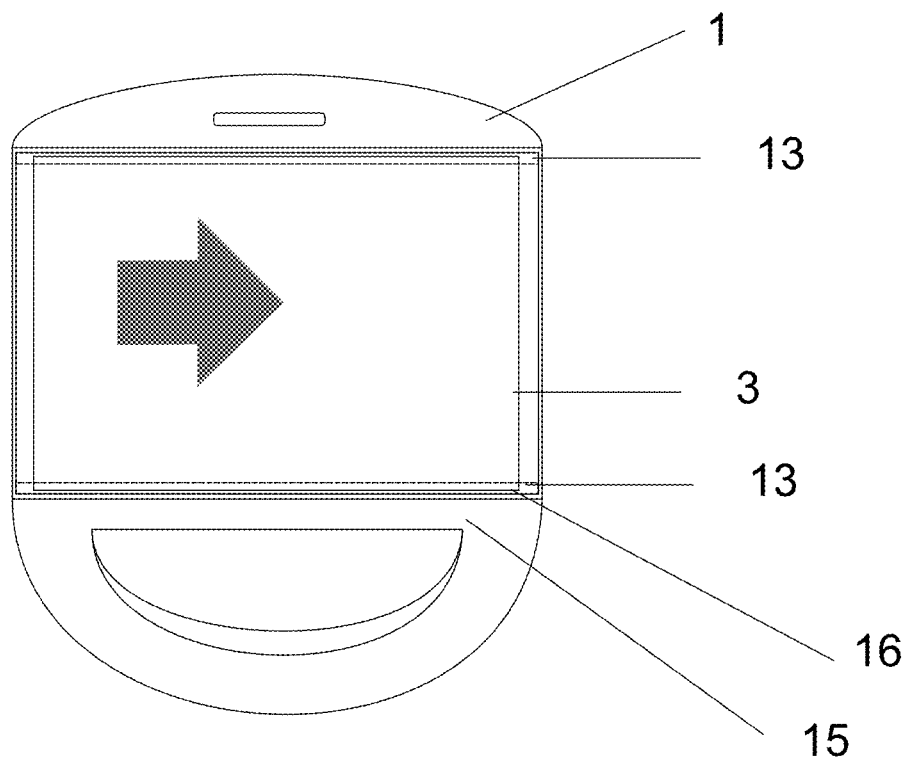

Therefore:

FIG. 1, in an anterior orthographic view, describes the support structure (1) constructive solution in which the anterior wall (15) has guides (13) provided at the top and at the bottom through which the mobile window slides laterally. The same figure shows the mobile window's lateral dislocation direction (3) until the right lateral portion (16) where a conversion is provided that will lead it, from behind, to compartment (14) on the posterior wall (8).

Figure 2:
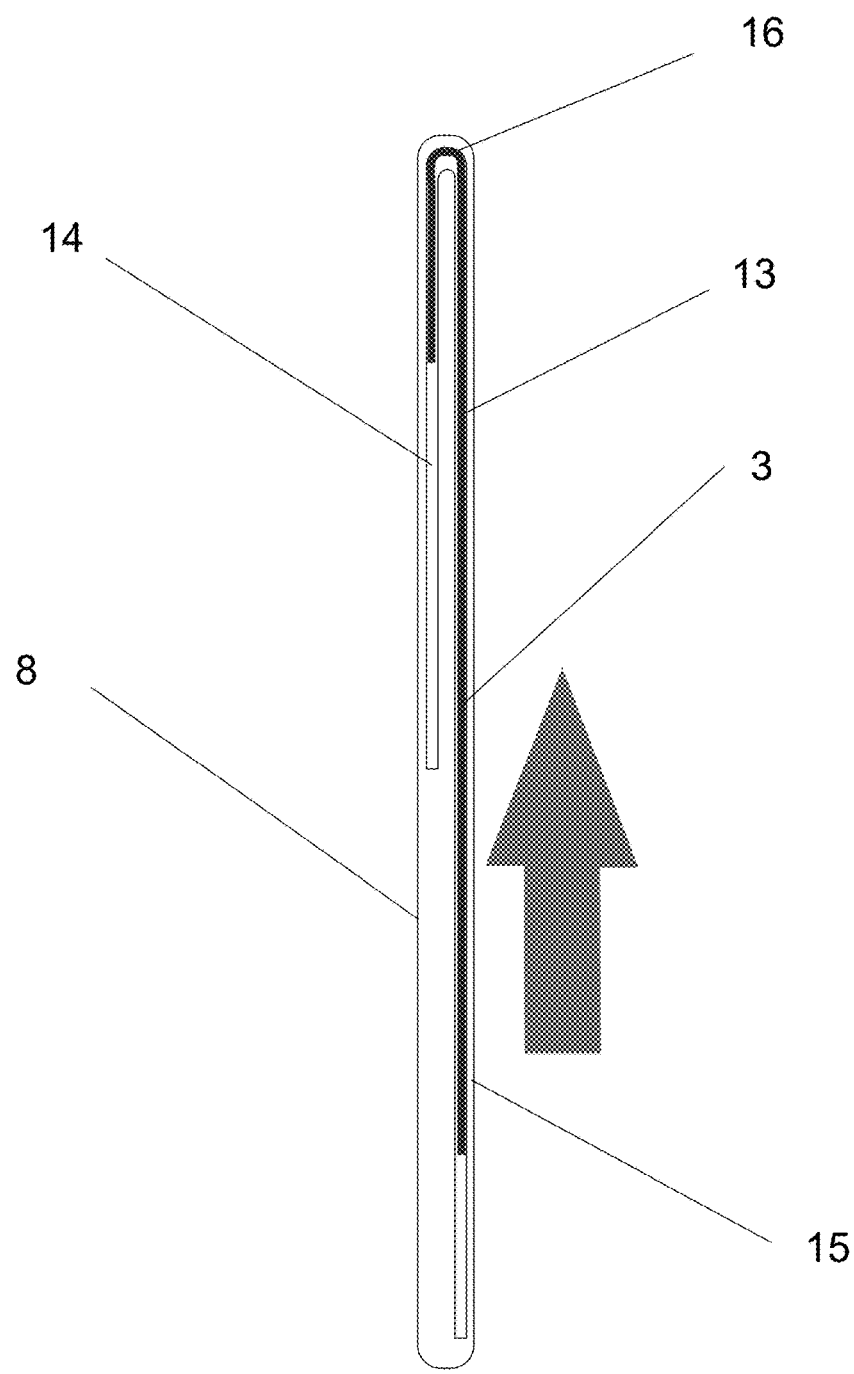

FIG. 2, in a superior orthographic view, describes the movement direction for the window (3) from the anterior wall (15) and through the guide (13) and from the curve (16) until the compartment (14) on the posterior wall (8).

Figure 3:
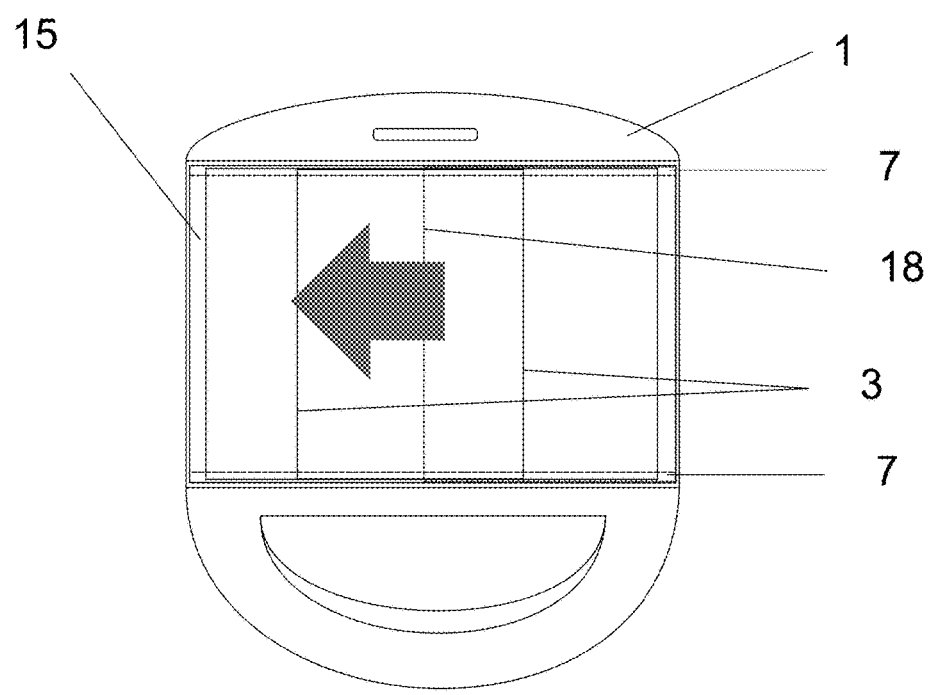
Figure 4:
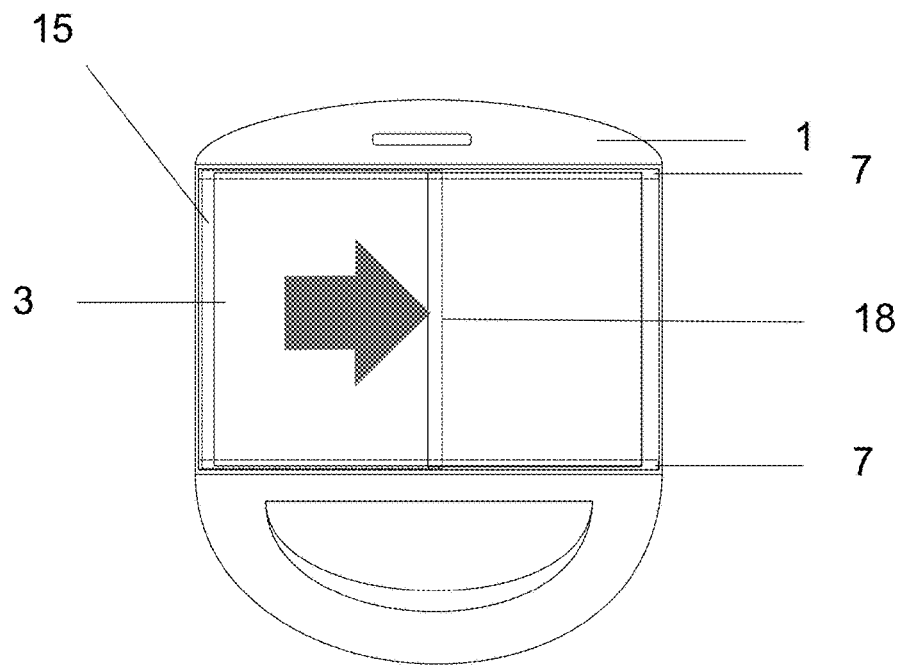

FIG. 3, in an anterior orthographic view, describes the movement direction for the closing of the mobile window (3) in the constructive solution, in which straight guides (7) and a fixed window (18) are provided on the support structure (1) anterior wall FIG. 4, in the same anterior orthographic view, describes the movement direction for opening the mobile window (3).

Figure 5:
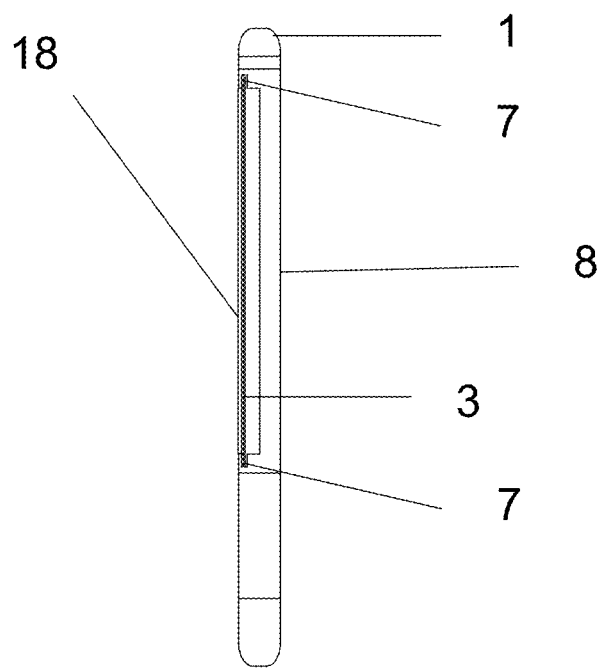

FIG. 5, in a lateral view, highlights the guides (7) dug in the superior and inferior portions of the support structure (1), in which the mobile window (3) is installed. It also shows the fixed window projection (18) as well as the posterior wall (8).

Figure 6:
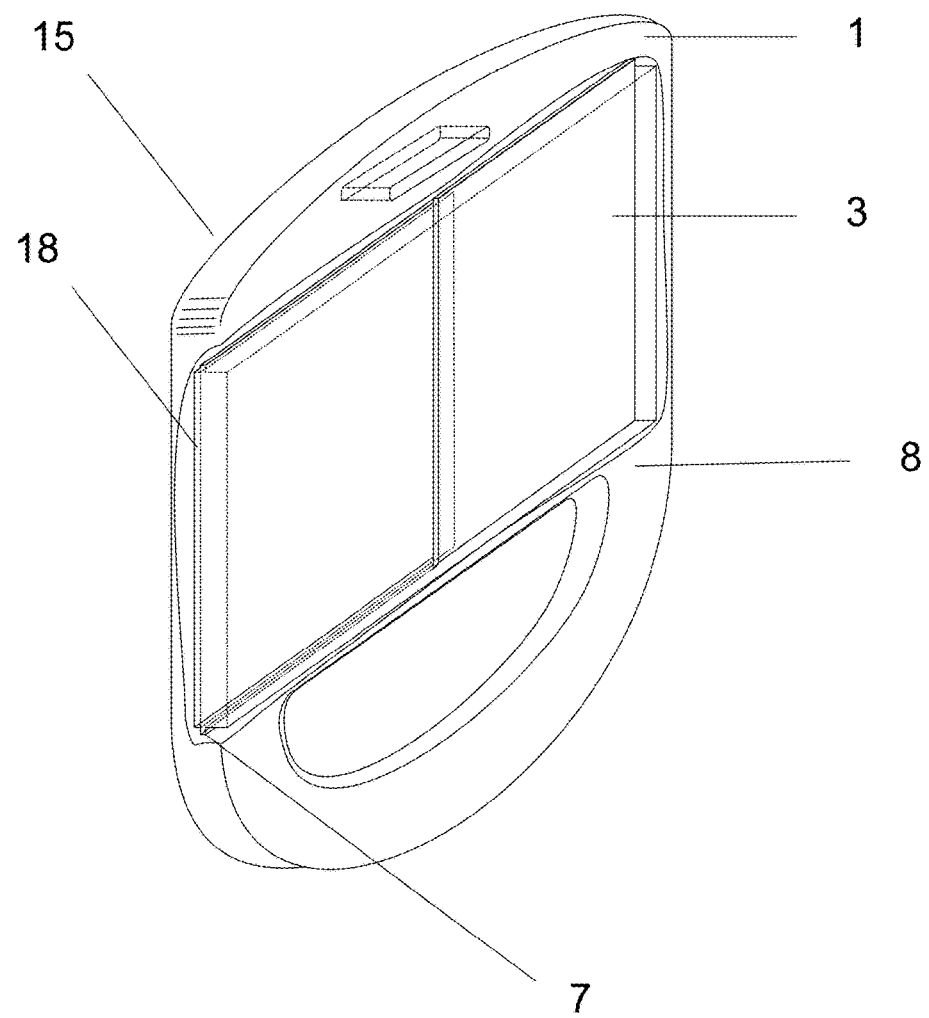

FIG. 6, in an above and to the side perspective, informs on the guide projection (7) in which the mobile window is installed (3) as well as the position of the fixed window (18) in relation to the anterior wall (15) of the support structure (1).

Figure 7:
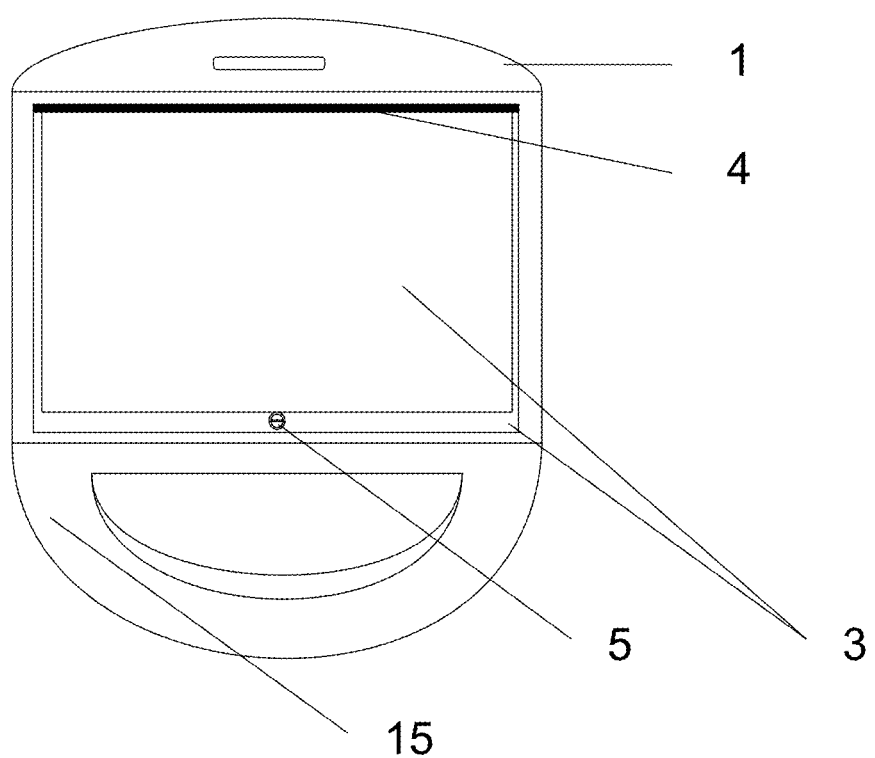

FIG. 7, in an anterior orthographic view, shows the constructive solution in which the mobile window (3) is tilted by the action of a hinge (4) and fixable by the action of a bolt (5) provided in the thread with a nut (6).

Figure 8:
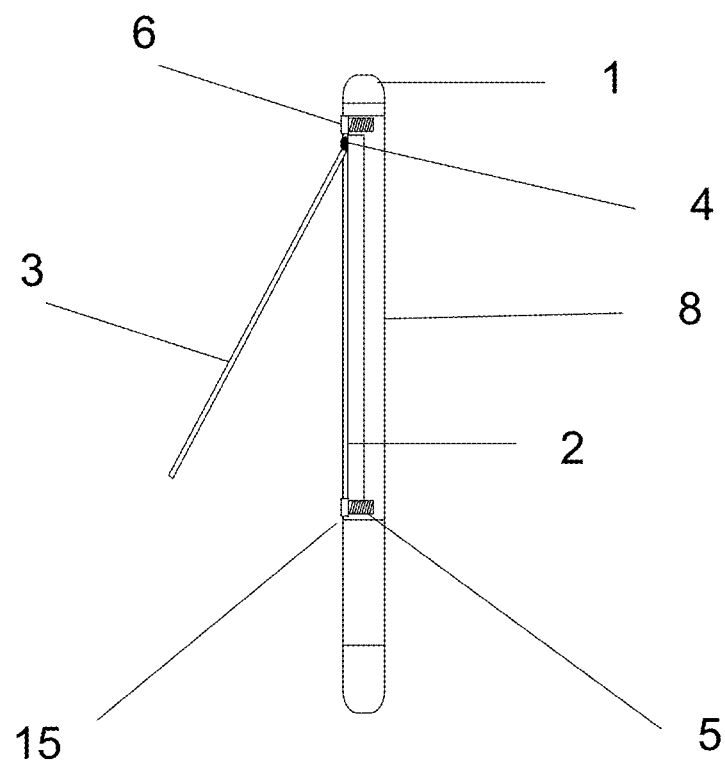

FIG. 8, in a lateral orthographic view, emphasizes the tilting of the mobile window (3) as well as the lowering (2) that receives the same window when closed, in relation to the anterior (15) and posterior (8) walls.

Figure 9:
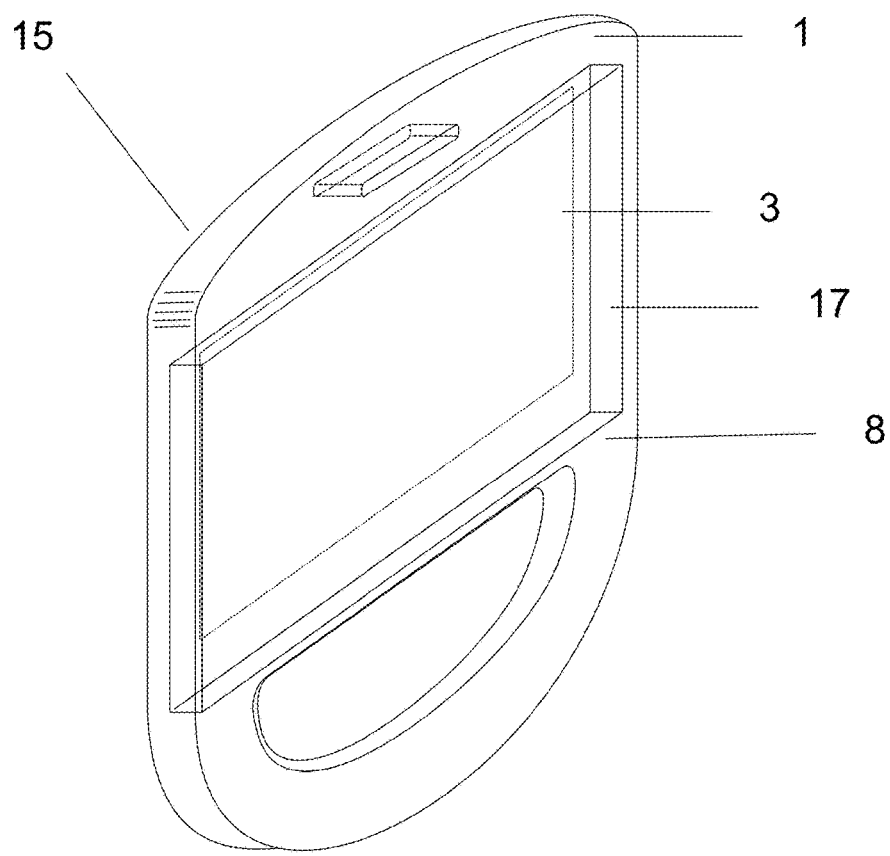

FIG. 9, in an above and to the side perspective, shows the position of the mobile window (3) in relation to the printed media compartment (17).

Figure 10:
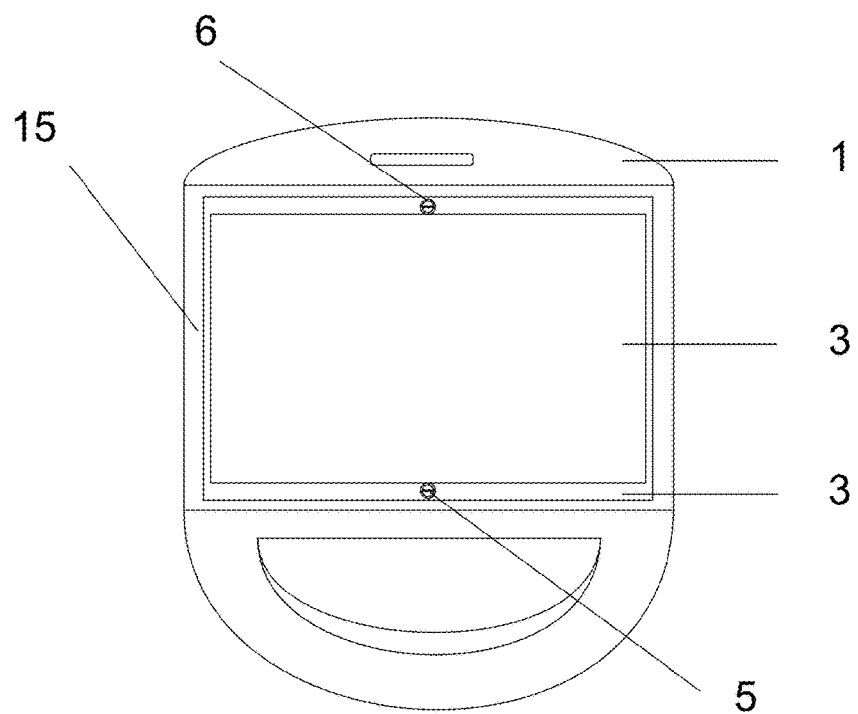

FIG. 10, in an anterior orthographic view, informs on the position of the bolts (6) and respective threads (5), with a nut to replace and fix the mobile window (3) from the support structure (1).

Figure 11:
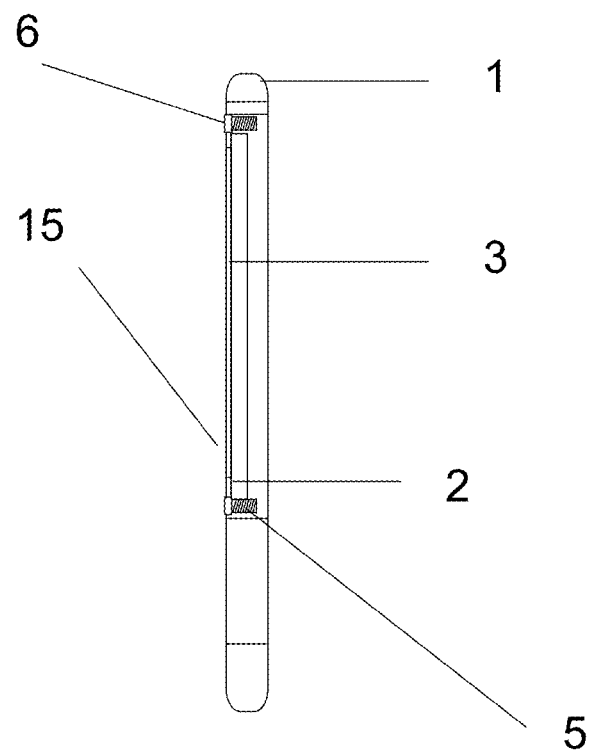

FIG. 11, visible in cross-section, shows the bolt (6) installed in the thread hole (5) with a nut when fixed to the lowered (2) mobile window (3 provided on the anterior wall (15) of the support structure (1).

DETAILED DESCRIPTION OF THE OBJECT OF THE PATENT

The object of the present report is constructive improvements that result in a mobile window that can be removed, tilted or laterally displaced to have access to a compartment in which the printed media is stored for visualization in a display coupled to a handrail in mass transportation vehicles.

This way, the improvements reported here take into consideration that the support structure may be lowered to receive the mobile window in the closing position or have guides in it. These guides can be straight, i.e., sliding only through the anterior portion of the support structure or curved at the lateral right side far end to meet the compartment designed on the posterior wall, together with the curved guided, it receives the mobile window.

It is important to note that, when the guides run only through the anterior wall of the support structure, the compartment for the reception of the mobile window is not produced, which is designed only when the guides are curved at the right lateral far end of the referred structure.

The improvements reported here allow for at least four constructive versions for the proposed support structure. One in which the mobile window is tilting, since there is a hinge and a bolt; another, in which the mobile window is removable through bolts; and yet another, in which the mobile window slides through inferior and superior guides, behind the fixed window, a little more than halfway through the anterior wall. Finally, there is another version, in which the mobile window runs through a guide with a curve at the lateral far end, from which a compartment, dug on the posterior wall, is designed to receive part of the mobile window, giving access to the printed media compartment.

With the exception of the later variable, where the mobile window is molded with enough flexible material to slide through the guides even in the curved lateral sector, in all cases, the anterior and posterior walls of the support structure are molded in rigid photopolymer with enough transparence to provide visualization of the printed media inside the compartment.

The invention claimed is:

1. Display for exhibiting replaceable print media for use in a mass transportation vehicle having a handrail for passengers, comprising:
    a) a support structure comprising a mass transportation vehicle handrail;
    b) a substantially planar compartment for containing a planar card having print or graphics printed thereon, said compartment being located on a front face of said support structure;
    c) a flexible transparent window for covering said planar card;
    d) upper and lower window guides located at upper and lower boundaries of the card compartment, said window guides configured to receive the upper and lower edges of the flexible transparent window and said window guides continue past the right boundary of the card compartment to loop around and continue on the support structure back side;
        wherein said window and window guides are configured to allow for closed and open positions;
        said closed position being accomplished by sliding said window left to cover the card; and
        said open position being accomplished by sliding said window right, sliding the window partially around to the back of the support structure and exposing the card so that the card can be removed from the compartment or replaced with a new card.

2. The display for exhibiting replaceable print media for use in a mass transportation vehicle in accordance with claim 1, wherein said flexible transparent window comprises at least one material selected from: glass, plastic, polymer, photopolymer, polycarbonate, and optical silicone.

3. The display for exhibiting replaceable print media for use in a mass transportation vehicle in accordance with claim 1, wherein said removable planar card securing means comprises at least one of the mechanisms selected from: hinge, bolt, nut, screw, and guide.

4. The display for exhibiting replaceable print media for use in a mass transportation vehicle in accordance with claim 1, wherein said compartment forms a contoured hand grip having an aperture for a passenger to insert a hand therethrough.

5. The display for exhibiting replaceable print media for use in a mass transportation vehicle in accordance with claim 3, wherein said planar card is removable from said container by at least one of the processes selected from: sliding said transparent window, removing said bolt, removing said screw.

6. The display for exhibiting replaceable print media for use in a mass transportation vehicle in accordance with claim 1, wherein said print or graphics on said planar card comprises an advertising notice.

* * * * *